United States Patent
Cheng et al.

(10) Patent No.: US 12,412,067 B2
(45) Date of Patent: Sep. 9, 2025

(54) VISUALIZATION OF BIOSIGNALS USING MACHINE-LEARNING GENERATED CONTENT

(71) Applicant: Apple Inc., Cupertino, CA (US)

(72) Inventors: Joseph Y. Cheng, Cupertino, CA (US); Bradley W. Griffin, Aptos, CA (US); Hanlin Goh, Santa Clara, CA (US); Helen Y. Weng, San Francisco, CA (US); Matthias R. Hohmann, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 18/080,736

(22) Filed: Dec. 13, 2022

(65) Prior Publication Data

US 2023/0342583 A1 Oct. 26, 2023

Related U.S. Application Data

(60) Provisional application No. 63/334,073, filed on Apr. 22, 2022.

(51) Int. Cl.
*G06N 3/02* (2006.01)

(52) U.S. Cl.
CPC ...... *G06N 3/02* (2013.01); *G06T 2207/20084* (2013.01)

(58) Field of Classification Search
CPC ........ G06N 3/02; G06N 3/0455; G06N 3/047; G06N 3/0475; G06N 3/088; G06T 2207/20084
See application file for complete search history.

(56) References Cited

U.S. PATENT DOCUMENTS

| | | | |
|---|---|---|---|
| 2018/0240257 A1* | 8/2018 | Li | G06V 10/774 |
| 2018/0286261 A1* | 10/2018 | Ahuja | G06F 3/013 |
| 2020/0215970 A1* | 7/2020 | Lee | G06V 10/764 |
| 2020/0251073 A1* | 8/2020 | Kano | G06F 16/637 |
| 2020/0275875 A1* | 9/2020 | Johnstone | A61B 5/165 |
| 2020/0405393 A1* | 12/2020 | Villongco | A61B 5/7267 |
| 2021/0166067 A1* | 6/2021 | Hayashi | G06F 18/22 |
| 2021/0286429 A1* | 9/2021 | Azemi | G06N 3/045 |

FOREIGN PATENT DOCUMENTS

WO WO-2020115487 A1 * 6/2020 ............. G06N 3/044

OTHER PUBLICATIONS

Boxun Fu, Fu Li, Yi Niu, Hao Wu, Yang Li, Guangming Shi, Conditional generative adversarial network for EEG-based emotion fine-grained estimation and visualization, Journal of Visual Communication and Image Representation, vol. 74, 2021 https://doi.org/10.1016/j.jvcir.2020.102982 (Year: 2021).*

* cited by examiner

*Primary Examiner* — Frank S Chen
(74) *Attorney, Agent, or Firm* — BAKERHOSTETLER (57) ABSTRACT

A method is provided that includes receiving biosignal data measured from a user, encoding the biosignal data into a vector, and generating, using a generative model, an image based on the vector. The generated image is provided for display.

20 Claims, 5 Drawing Sheets

VISUALIZATION OF BIOSIGNALS USING MACHINE-LEARNING GENERATED CONTENT

CROSS REFERENCE TO RELATED APPLICATIONS

This application claims the benefit of priority to U.S. Provisional Patent Application No. 63/334,073, entitled, "Visualization of Biosignals Using Machine-Learning Generated Content", filed on Apr. 22, 2022, the disclosure of which is hereby incorporated herein in its entirety.

TECHNICAL FIELD

The present description relates generally to electronic devices including, for example, the visualization of biosignals using electronic devices.

BACKGROUND

Electronic devices such as smartphones and smart watches have increasingly complex sensor capabilities. These sensor capabilities include the ability to measure and monitor a variety of biosignals. For example, a smart watch may have photoplethysmography (PPG) and/or electrocardiogram (ECG) capabilities. In addition, electronic devices with other capabilities such as electroencephalography (EEG) are becoming less expensive and more accessible.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as smartphones and smart watches have increasingly complex sensor capabilities. These sensor capabilities include the ability to measure and monitor a variety of biosignals. For example, a smart watch may have photoplethysmography (PPG) and/or electrocardiogram (ECG) capabilities. In addition, electronic devices with other capabilities such as electroencephalography (EEG) are becoming less expensive and more accessible. While the ability to measure and monitor biosignals is improving, the biosignals themselves are often difficult to understand and interpret. Features such as heart rate or respiratory rate may be extracted from the biosignals and displayed to a user. However, higher-level features such as stress or workload may be difficult to extract and present to the user in objective manner.

The subject technology provides a data-driven approach to visualizing biosignals. Rather than focusing on extracting features from biosignal data, the subject technology converts biosignal data into machine-learning generated content such as artwork. For example, biosignal data may be encoded into a vector that is passed into a generative model. The generative model may be trained to generate artwork (e.g., content or subject matter that is presented in a particular artistic style). As the biosignal data changes over time, the artwork generated by the generative model also changes allowing a user to associate examples of the generated artwork with different states of body and/or mind.

Figure 1:
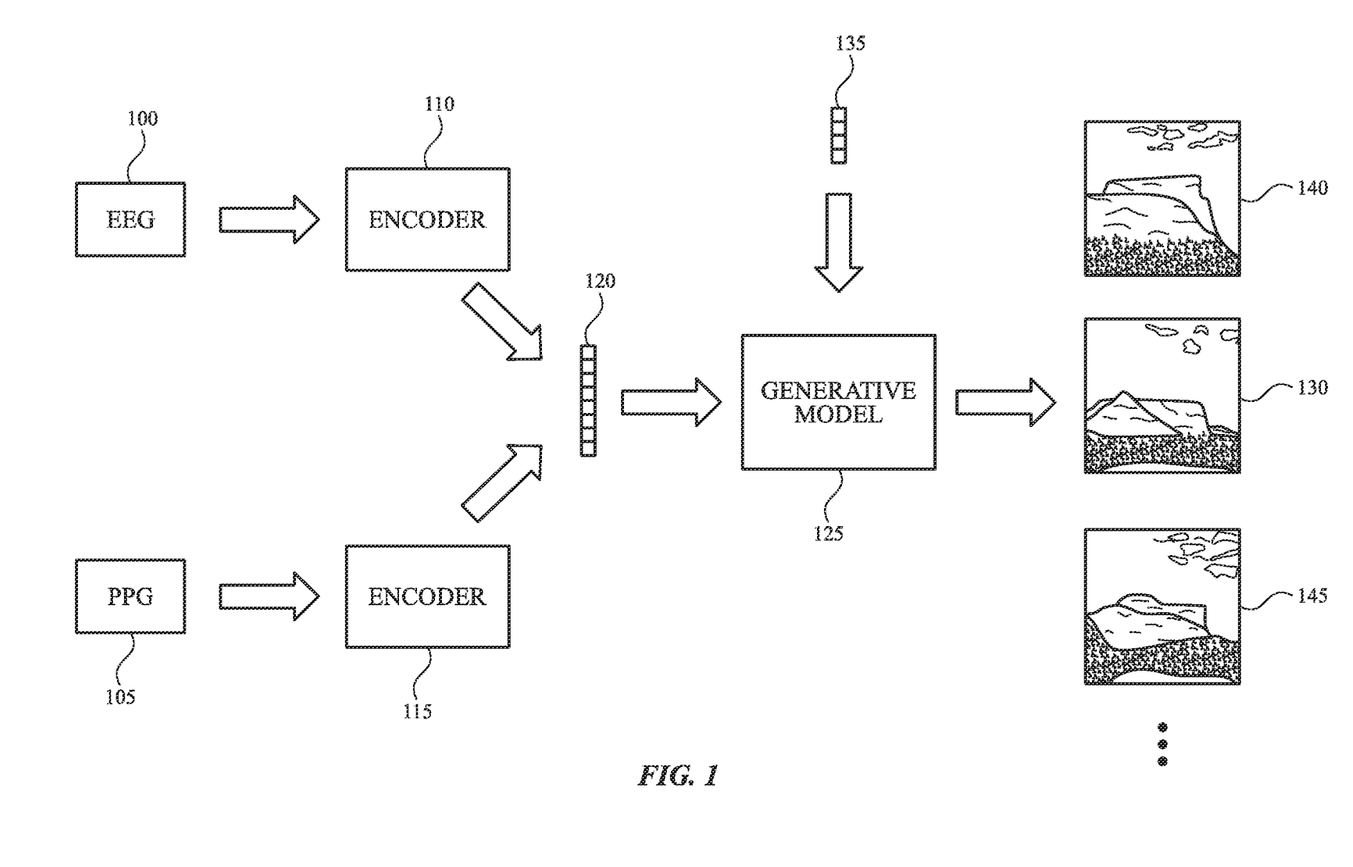
FIG. 1 is a block diagram illustrating a process flow according to aspects of the subject technology.

FIG. 1 is a block diagram illustrating a process flow according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 1, two biosignals, EEG 100 and PPG 105, are measured from a user. The subject technology is not limited to these two types of biosignals and may be implemented using any signal, electrical or non-electrical, generated by a living being that can be measured and monitored. In addition, the subject technology may be implemented using a single biosignal or more than two biosignals. Sampled data from EEG 100 and PPG 105 are provided to respective ones of encoder 110 and encoder 115. Encoder 110 and encoder 115 are configured to encode their respective biosignal data into respective portions of vector 120. Vector 120 is a data structure containing values that correspond with samples of the biosignals encoded by encoder 110 and encoder 115. Encoder 110 may encode a sample of its biosignal into a first portion of vector 120 and encoder 115 may encode a sample of its biosignal into a second portion of the vector 120.

Vector 120 is provided as an input to generative model 125. Generative model 125 may be trained as a generative adversarial network (GAN) to generate content such as artwork represented by image 130 based on vector 120. Generative model 125 may be trained to generate an image having a particular content or subject matter type such as landscapes, potted plants, abstract shapes, etc. In addition, generative model 125 may be trained to generate the image in a particular artistic style such as in the style of Monet, Van Gogh, etc. The subject technology is not limited to generative model 125 being trained for a single type of content or a single artistic style. Generative model 125 may be trained for multiple content types and/or artistic styles and may receive selection vector 135 as an input to select which of the content types and/or artistic styles should be used to generate an image. Selection vector 135 is a data structure containing one or more values corresponding to selections of content type, artistic style, etc. The selections represented in selection vector 135 may be based on user selections made via a user interface.

Biosignals EEG 100 and PPG 105 may be periodically sampled and the biosignal data encoded into vectors for generative model 125 to generate a sequence of images over time. For example, image 140 may have been generated by generative model 125 in an iteration previous to the iteration that resulted in image 130. Image 145 may represent an image generated in an iteration following the iteration that resulted in image 130. In this manner, a user can view images over time that reflect changes in the underlying biosignals measured from the user. The biosignals vary in response to changes in the physiological and/or mental state of the user from which the biosignals are measured. For example, during yoga or a mindfulness exercise, a user's physiological and/or mental state may change between a still mediation state and a stretching state in which the user is moving to stretch out muscles. Accordingly, the images correlate substantially with the state of the user. For example, similar or identical biosignals are encoded into similar or identical vectors, which are used to generate similar or identical images. The images may be similar or identical in the number, arrangement, presentation, etc. of the content (e.g., trees, vases, mountains, people, etc.) included in the image and/or the artistic style of the image. The subject technology is not limited to any particular rate for sampling the biosignals and generating the images. For example, the process may repeat every second, 10 seconds, minute, hour, etc., and the rate may be selectable by the user.

The example above describes an implementation in which biosignals are measured and sampled from a single user. The subject technology also may be implemented using biosignals measured and sampled from multiple users. For example, a group of two or more users may provide access to or send vectors encoded from their respective biosignal data. The vectors for the group of users may then be used as input to a generative model and a single image may be generated for the group. The single image may be provided for display to the group and/or to individuals within the group. The generated image may be used as a representation of group synchrony where the alignment of biosignals is an indicator of how well members of the group are connecting.

Figure 2:
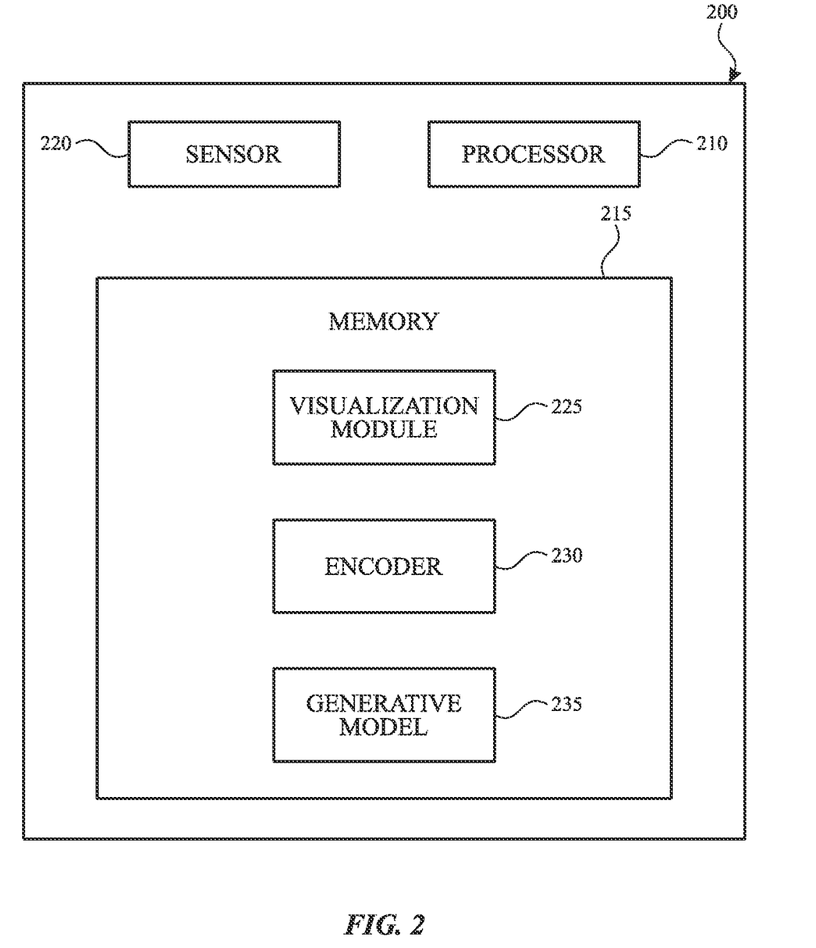
FIG. 2 is a block diagram illustrating components of an electronic device according to aspects of the subject technology.

FIG. 2 is a block diagram illustrating components of an electronic device according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, electronic device 200 includes processor 210, memory 215, and sensor 220. Processor 210 may include suitable logic, circuitry, and/or code that enable processing data and/or controlling operations of electronic device 200. In this regard, processor 210 may be enabled to provide control signals to various other components of electronic device 200. Processor 210 may also control transfers of data between various portions of electronic device 200. Additionally, the processor 210 may enable implementation of an operating system or otherwise execute code to manage operations of electronic device 200.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 215 may include suitable logic, circuitry, and/or code that enable storage of various types of information such as received data, generated data, code, and/or configuration information. Memory 215 may include, for example, random access memory (RAM), read-only memory (ROM), flash memory, and/or magnetic storage. As depicted in FIG. 2, memory 215 contains visualization module 225, encoder 230, and generative model 235. The subject technology is not limited to these components both in number and type, and may be implemented using more components or fewer components than are depicted in FIG. 2.

According to aspects of the subject technology, visualization module 225 comprises a computer program having one or more sequences of instructions or code together with associated data and settings. Upon executing the instructions or code, one or more processes are initiated to present machine-learning generated content based on biosignal data measured from one or more users. The one or more processes may obtain biosignal data from sensor 220, encode the biosignal data into a vector using encoder 230, and generate content based on the vector using generative model 235. Visualization module 225 also may provide a user interface within which the generated content may be presented. In addition, the user interface may provide an interface for a user to select options for generating the content, such as selecting content type and/or artistic style to be used to generate the content, rate at which content is generated from the biosignal data, etc.

According to aspects of the subject technology, encoder 230 is a machine learning model trained to encode a sample of biosignal data (e.g., 3 seconds, 10 seconds, etc.) into a representative vector. Encoder 230 may obtain samples of the biosignal data directly from sensor 220, or encoder 230 may retrieve the samples of biosignal data from a data repository into which sensor 220 may store samples of the biosignal data. Encoder 230 also may obtain samples of biosignal data captured by sensors that are external to and communicatively coupled with electronic device 200. Encoder 230 may be trained as an autoencoder, a variational autoencoder, or using self-supervised learning approaches, such as contrastive learning, to generate vectors representative of respective samples of biosignal data. The representative vectors may be decodable to regenerate the corresponding samples of biosignal data. Encoder 230 may represent multiple encoders that are trained for different respective types of biosignals (e.g., EEG, ECG, PPG, etc.).

According to aspects of the subject technology, generative model 235 is a machine learning model trained to generate content, such as an image, using one or more vectors encoded by encoder 230 as inputs. As noted above, generative model 235 may be trained as a generative adversarial network using datasets made up of sample images containing desired content types presented in desired artistic styles. Generative model 235 is trained using the dataset to generate new images that are likely indistinguishable from the training dataset. Generative model 235 also may be trained using invertible models or flow models. In some implementations, generative model 235 may be trained in two stages where a first model is trained to generate content of the image based on a content type and a second model is trained to stylize the image based on an artistic style. In other implementations, encoder 230 and generative model 235 may be trained together end-to-end.

Datasets used to train encoder 230 and/or generative model 235 may be labeled to indicate different physiological or mental states. The labeled states may include, but are not limited to, relaxed, agitated, scared, meditative, level of physical exertion, engaged in a particular type of activity, etc. Groups of states may be associated with an activity such as mindfulness, exercising, etc. The datasets may be labeled by subjects from whom biosignal data is captured for the training datasets by the subjects selecting a state from a set of states that best reflects the subject's current state. Encoder 230 and/or generative model 235 may then be trained to output label-consistent vectors and/or content.

The foregoing examples describe encoding biosignal data into vectors and using the vectors as inputs to generate content. According to aspects of the subject technology, features such as heart rate or respiratory rate may be extracted from the biosignal and used to generate the content. For example, heart rate may be used to modulate a color palette used to generate an image. The extracted feature may be used as another input to generative model 235 or may be used as an input to a post-processing layer following generative model 235.

Generative model 235 has been described as generating content such as images based on vectors encoded by encoder 230. The subject technology is not limited to image content. For example, generative model 235 may be trained to generate audio content such as music or text content based on the vectors from encoder 230.

Visualization module 225 may provide a selectable option for a user to change the content being generated and presented for different physiological or mental states. For example, the selectable option may rotate vectors generated by encoder 230 before being provided as input to generative model 235, thereby changing the content generated by generative model 235.

According to aspects of the subject technology, sensor 220 represents one or more sensors configured to measure biosignals from a user, such as an EEG sensor, an ECG sensor, a PPG sensor, an accelerometer, a microphone, an image sensor, and the like. Sensor 220 may represent multiple sensors each configured to measure different respective biosignals. Sensor 220 may represent the sensor itself or may represent an interface configured to connect with and receive biosignal data from a sensor remote to electronic device 200.

Figure 3:
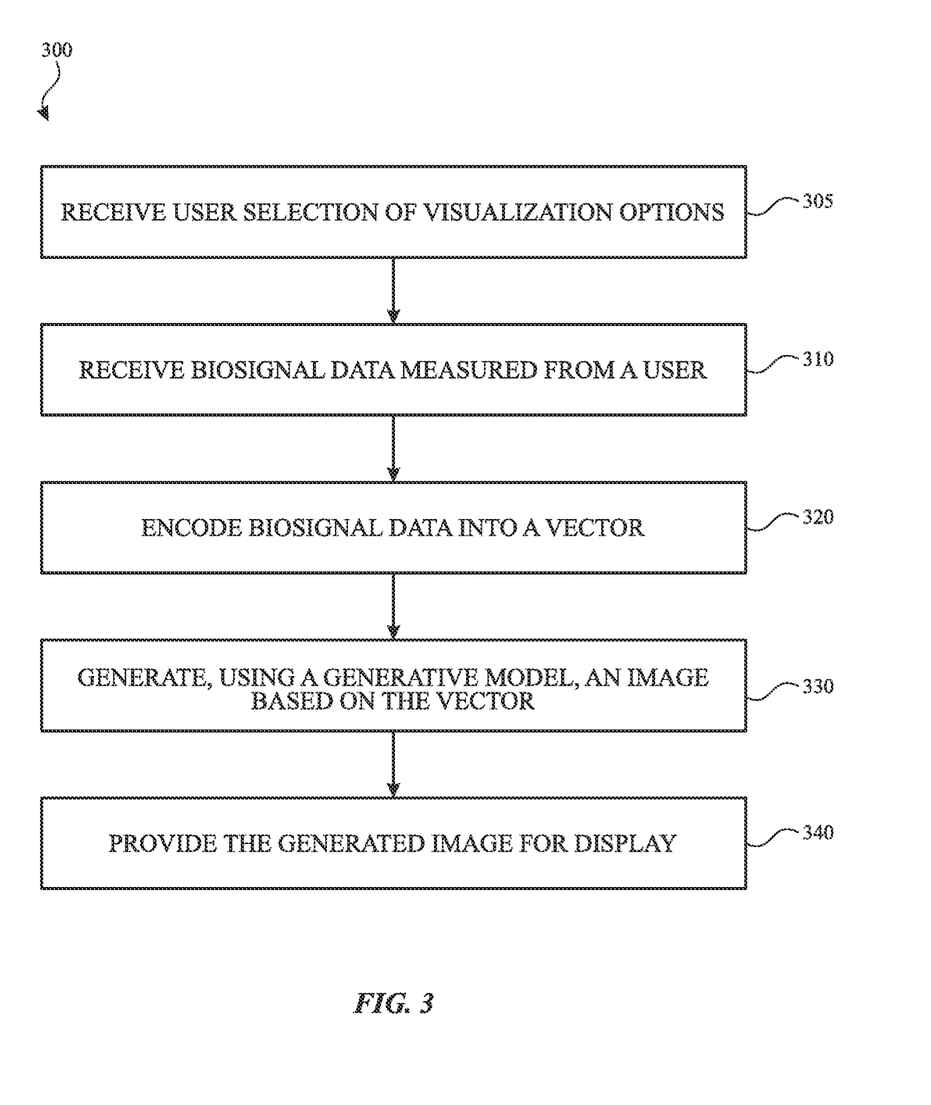
FIG. 3 illustrates an example process for generating an image based on biosignal data according to aspects of the subject technology.

FIG. 3 illustrates an example process for generating an image based on biosignal data according to aspects of the subject technology. For explanatory purposes, the blocks of process 300 are described herein as occurring in serial, or linearly. However, multiple blocks of process 300 may occur in parallel. In addition, the blocks of process 300 need not be performed in the order shown and/or one or more blocks of process 300 need not be performed and/or can be replaced by other operations. FIG. 3 will be discussed together with FIG. 4, which depicts images generated at points along a timeline at which a user is in different states.

Figure 4:
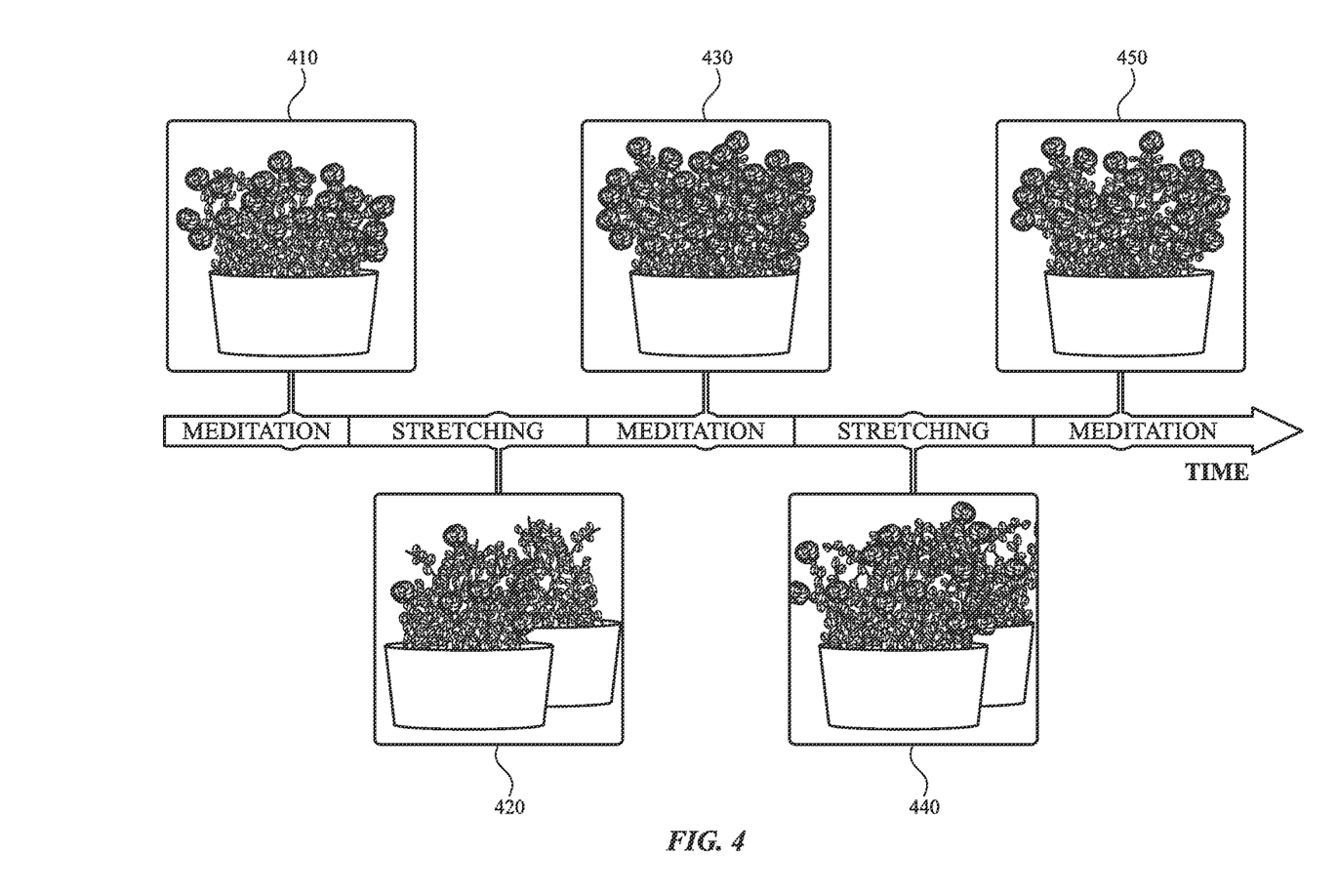
FIG. 4 depicts images generated at points along a timeline at which a user is in different states according to aspects of the subject technology.

Example process 300 may be initiated in response to a user launching visualization module 225 on an electronic device. Visualization module 225 may be part of a broader application such as a mediation or fitness application. The user may launch visualization module 225 separately within the broader application or visualization module 225 may automatically launch when the broader application is launched. Visualization module 225 may be configured with default visualization options, such as content/subject matter for the generated content, artistic style for the generated content, frequency of repeating the generation of content, etc. Alternatively, process 300 may include receiving user selection(s) of visualization options via a user interface (block 305). Process 300 includes receiving biosignal data measured from a user (block 310). For example, the timeline presented in FIG. 4 depicts images generated based on EEG and PPG biosignal data measured from a user. The biosignal data is encoded into a vector (block 320). An image is generated using a generative model and the vector, where the image correlates substantially with a state of the user (block 330). For example, image 410 depicted in FIG. 4 is generated while the user is in a meditation state along the illustrated timeline. The generated image is then provided for display (block 340).

As noted above, the process of generating an image based on biosignal data may be repeated. The process may be repeated periodically at a rate that may be set by a user. Alternatively, the process may repeat in response to a user selection via a user interface. FIG. 4 illustrates five iterations of the process of generating an image as a user alternates between a meditation state and a stretching state. Images 410, 430, and 450 are generated while the user is in the meditation state, and images 420 and 440 are generated while the user is in the stretching state. In the example depicted in FIG. 4, potted plants are selected as the content of the generated images. While not identical, the images generated for the two different states correlate substantially with the state of the user at the time of generating the respective image. For example, images 410, 430, and 450 generated while the user was in the meditation state include a single potted plant that is flowering. On the other hand, images 420 and 440 generated while the user was in the stretching state each include multiple potted plants with noticeably fewer flowers. In addition to being used to indicate different activities, such as meditation and stretching, variations in the generated images may indicate deviations within a single activity, such as losing focus during a meditation session.

Figure 5:
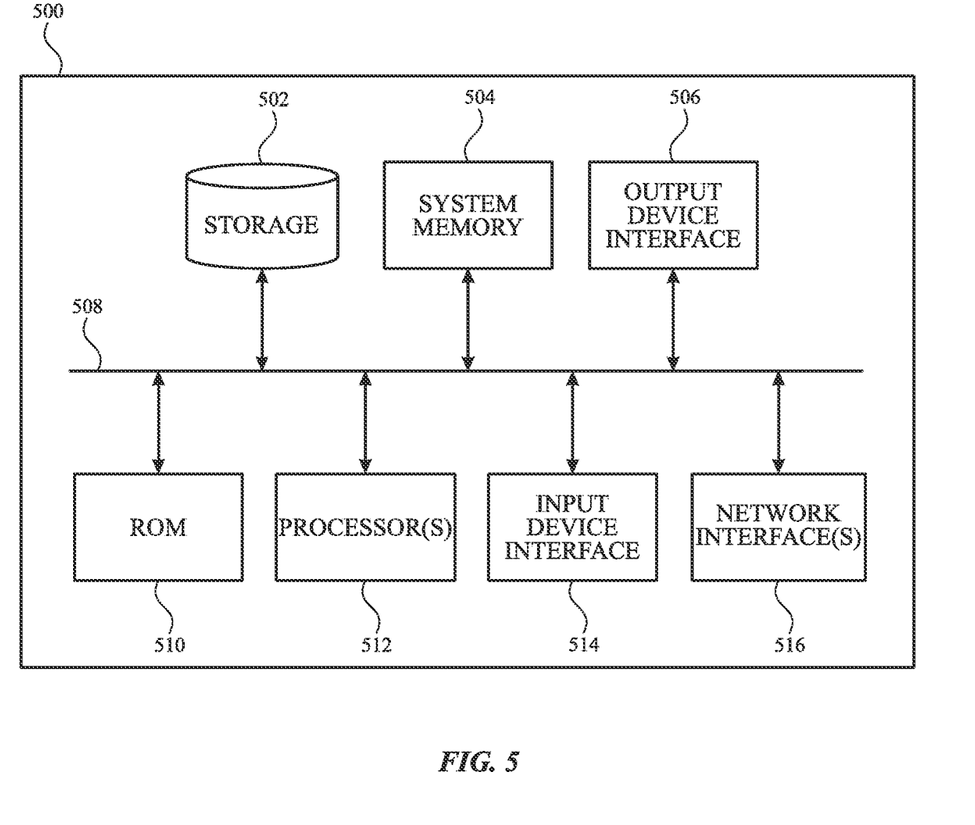
FIG. 5 illustrates an electronic system with which one or more implementations of the subject technology may be implemented.

FIG. 5 illustrates an electronic system 500 with which one or more implementations of the subject technology may be implemented. Electronic system 500 can be, and/or can be a part of, electronic device 200 shown in FIG. 2. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

In accordance with the subject disclosure, a method is provided. The method includes receiving biosignal data measured from a user, encoding the biosignal data into a vector, and generating, using a generative model and the vector, an image that correlates substantially with a state of the user. The generated image is provided for display.

The biosignal data may be measured from a plurality of different biosignals. The biosignal data may be measured from a plurality of users. The biosignal data may be encoded using an autoencoder.

Generating the image may include generating image content of the image based on a content type, and stylizing the image content of the image based on an artistic style. The content type and the artistic style may be provided as inputs to the generative model. The content type and the artistic style may be selected by the user.

The method may further include extracting a feature from the biosignal data, wherein the image is generated further based on the extracted feature. The generative model may be a generative adversarial network. The method may further include rotating the vector. The receiving, encoding, generating, and providing steps may be repeated periodically.

In accordance with the subject disclosure, a non-transitory computer-readable medium storing instructions is provided. The instructions, when executed by one or more processors, cause the one or more processors to perform operations including receiving biosignal data measured from a user, encoding the biosignal data into a vector, generating, using a generative model and the vector, an image that correlates substantially with a state of the user, wherein the image comprises image content based on a content type and is stylized based on an artistic style, and providing the generated image for display.

The biosignal data may be measured from a plurality of different biosignals. The biosignal data may be measured from a plurality of users. The content type and the artistic style may be selected by the user and are provided as inputs to the generative model. The operations may further include extracting a feature from the biosignal data, wherein the image is generated further based on the extracted feature. The operations may further include periodically repeating the receiving, encoding, generating, and providing steps.

In accordance with the subject disclosure, an electronic device having a memory storing a plurality of computer programs and one or more processors configured to execute instructions of the plurality of computer programs is provided. The instructions are to receive biosignal data measured from a user, encode, using an autoencoder, the biosignal data into a vector, generate, using a generative adversarial network and the vector, content that correlates substantially with a state of the user, provide the generated image for display, and repeat periodically the receive, encode, generate, and provide steps.

The content may comprises an image, wherein image content of the image may be generated based on a content type, wherein the image content of the image may be stylized based on an artistic type, and wherein the content type and artistic style may be selected by the user. The instructions may further be to extract a feature from the biosignal data, wherein the content is generated further based on the extracted feature.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving first biosignal data measured from a user;
encoding the first biosignal data into a first vector;
generating, using a generative model and the first vector, a first image by generating first artistic content that correlates substantially with a first state of the user and a first content type selected from a plurality of content types;
providing the generated first image for display;
encoding second biosignal data measured from the user, the second biosignal data different from the first biosignal data, into a second vector; and
generating, using the generative model and the second vector, a second image with second artistic content, different from the first artistic content, that correlates with the first content type selected from the plurality of content types.

2. The method of claim 1, wherein the first biosignal data is measured from a plurality of different biosignals.

3. The method of claim 1, wherein the first biosignal data is measured from a plurality of users in a group, and wherein generating the first artistic content comprises generating, based on an alignment of the first biosignal data measured from the plurality of users, the first artistic content to represent group synchrony of the group.

4. The method of claim 1, wherein the first biosignal data is encoded using an autoencoder.

5. The method of claim 1, wherein the plurality of content types do not include human faces, and wherein generating the first image further comprises:
stylizing the first artistic content of the first image based on an artistic style.

6. The method of claim 5, wherein the first content type and the artistic style are provided as inputs to the generative model.

7. The method of claim 6, wherein the first content type and the artistic style are selected by the user and provided as inputs to the generative model as a selection vector.

8. The method of claim 1, further comprising:
extracting a feature from the first biosignal data,
wherein the first image is generated further based on the extracted feature.

9. The method of claim 1, wherein the generative model is a generative adversarial network.

10. The method of claim 1, further comprising:
receiving a user selection relating to the plurality of content types; and
rotating the first vector based on the user selection prior to generating the first image using the generative model and the first vector.

11. The method of claim 1, further comprising:
encoding third biosignal data measured from the user, the third biosignal data different from the first biosignal data and the second biosignal data, into a third vector; and
generating, using the generative model and the third vector, a third image with second artistic content that correlates with a second content type, different from the first content type, selected from the plurality of content types.

12. A non-transitory computer-readable medium storing instructions which, when executed by one or more processors, cause the one or more processors to perform operations comprising:
receiving first biosignal data measured from a user;
encoding the first biosignal data into a first vector;
generating, using a generative model and the first vector, a first image that correlates substantially with a first state of the user, wherein generating the first image comprises:
generating first image content based on the first vector and a first content type selected from a plurality of content types, and
stylizing the generated first image content based on an artistic style;
providing the generated first image for display;
encoding second biosignal data measured from the user, the second biosignal data different from the first biosignal data, into a second vector; and
generating, using the generative model and the second vector, a second image with second image content, different from the first image content, that correlates with the first content type selected from the plurality of content types.

13. The non-transitory computer-readable medium of claim 12, wherein the first biosignal data is measured from a plurality of different biosignals.

14. The non-transitory computer-readable medium of claim 12, wherein the first biosignal data is measured from a plurality of users.

15. The non-transitory computer-readable medium of claim 12, wherein the first content type and the artistic style are selected by the user and are provided as inputs to the generative model.

16. The non-transitory computer-readable medium of claim 12, wherein the operations further comprise:
extracting a feature from the first biosignal data,
wherein the first image is generated further based on the extracted feature.

17. The non-transitory computer-readable medium of claim 12, wherein the operations further comprise periodically repeating the receiving, encoding, generating, and providing steps.

18. An electronic device, comprising:
a memory storing a plurality of computer programs; and
one or more processors configured to execute instructions of the plurality of computer programs to:
receive first biosignal data measured from a user;
encode, using an autoencoder, the first biosignal data into a first vector;
generate, using a generative adversarial network and the first vector, first content that correlates substantially with a first state of the user and a first content type selected from a plurality of content types;

provide the generated first content for display;

encode second biosignal data measured from the user, the second biosignal data different from the first biosignal data, into a second vector; and generate, using the generative adversarial network and the second vector, second content, different from the first content, that correlates with the first content type selected from the plurality of content types.

19. The electronic device of claim 18, wherein the first content is stylized based on an artistic type, and wherein the first content type and artistic style are selected by the user.

20. The electronic device of claim 18, wherein the one or more processors are configured to further execute instructions of the plurality of computer programs to:

extract a feature from the first biosignal data, wherein the first content is generated further based on the extracted feature.

\* \* \* \* \*